United States Patent [19]

Kotowicz

[11] Patent Number: 4,575,131
[45] Date of Patent: Mar. 11, 1986

[54] AIR LINE TO EXHAUST SYSTEM CONNECTOR

[75] Inventor: Cedric R. Kotowicz, Addison, Ill.

[73] Assignee: CED's Inc., Addison, Ill.

[21] Appl. No.: 476,043

[22] Filed: Mar. 17, 1983

Related U.S. Application Data

[63] Continuation-in-part of Ser. No. 414,967, Sep. 7, 1982, abandoned.

[51] Int. Cl.⁴ .............................................. F16L 41/02
[52] U.S. Cl. .................................... 285/158; 285/199
[58] Field of Search ............... 285/199, 198, 197, 158; 137/318

[56] References Cited

U.S. PATENT DOCUMENTS

| | | | |
|---|---|---|---|
| 406,794 | 7/1889 | Taylor . | |
| 1,048,364 | 12/1912 | Smith . | |
| 1,131,003 | 3/1915 | Powell et al. . | |
| 1,178,234 | 4/1916 | Hayden | 285/199 |
| 1,198,528 | 9/1916 | Deitz | 285/197 X |
| 1,308,853 | 7/1919 | McVoy | 285/404 X |
| 3,547,144 | 12/1970 | Mullins | 285/199 X |
| 3,746,308 | 7/1973 | Vatterott | 285/197 X |
| 3,752,185 | 8/1973 | Mullins | 137/318 X |
| 3,799,434 | 3/1974 | Heidacker | 236/101 |
| 3,833,019 | 9/1974 | Diggs | 137/318 X |
| 3,870,348 | 3/1975 | Hawkins | 285/197 |
| 3,933,170 | 1/1976 | Olson, Jr. | 285/197 X |
| 3,978,881 | 9/1976 | Mouranie | 137/318 |
| 3,995,655 | 12/1976 | Sands | 137/318 |
| 4,180,286 | 12/1979 | Ginter, Jr. | 285/328 |

FOREIGN PATENT DOCUMENTS

| | | | |
|---|---|---|---|
| 222515 | 4/1958 | Australia | 285/197 |
| 547776 | 12/1922 | France | 285/199 |
| 1341773 | 9/1963 | France | 137/318 |

*Primary Examiner*—Thomas F. Callaghan
*Attorney, Agent, or Firm*—Laff, Whitesel, Conte & Saret

[57] ABSTRACT

An air line to pipe connector is formed from a saddle containing two bolt openings, a U-bolt with two threaded ends fitting into the bolt openings, a connector element sitting onto the saddle at an aperture in the saddle, and nuts which tighten to attach and secure the connector to a drilled hole in a pipe. The connector element has a tapered pipe for fitting into the hole in the pipe, and a connector end for attachment to an air line.

7 Claims, 8 Drawing Figures

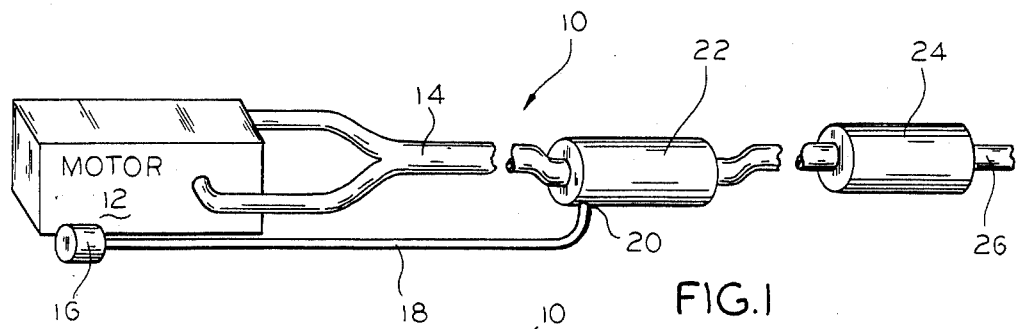
FIG.1
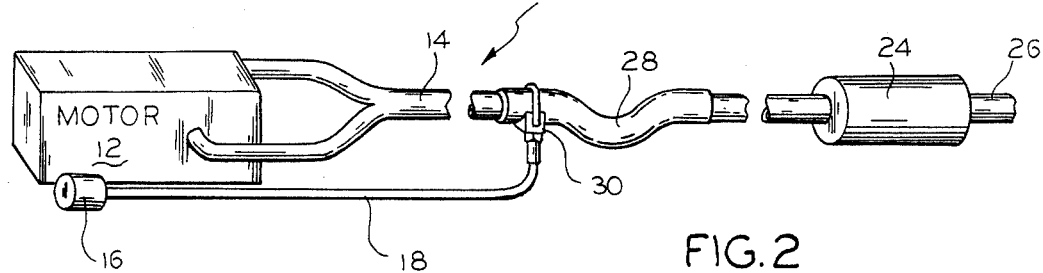
FIG.2
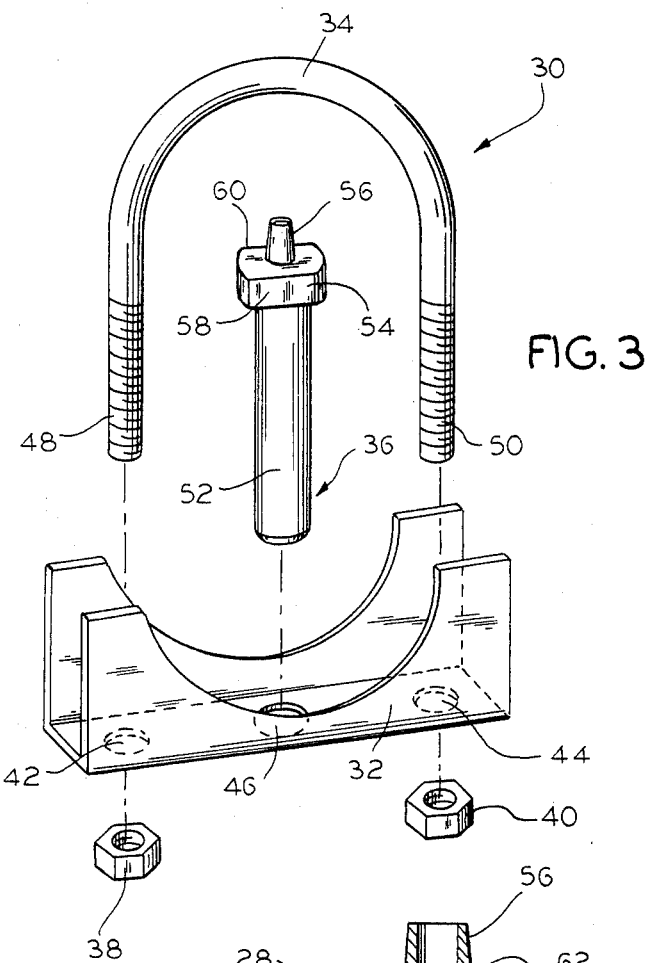
FIG.3
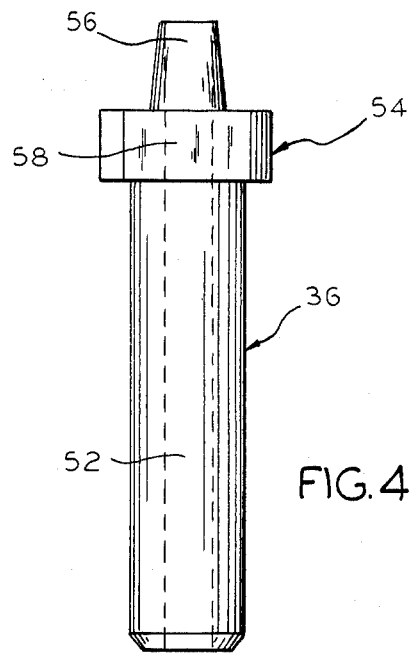
FIG.4
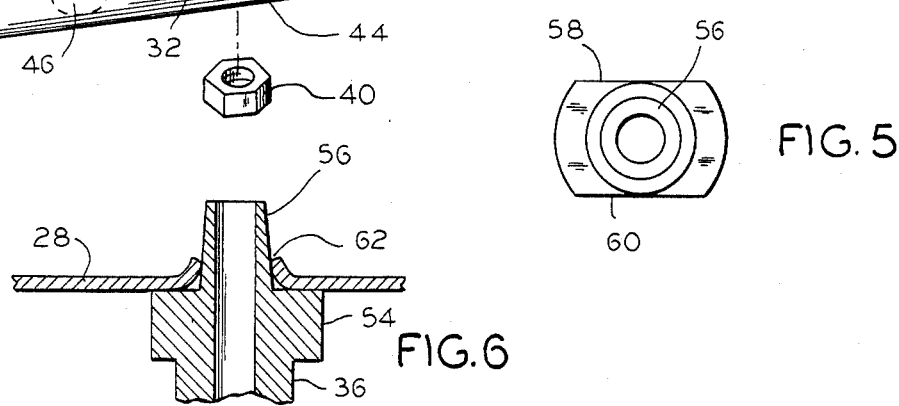
FIG.5
FIG.6

AIR LINE TO EXHAUST SYSTEM CONNECTOR

This is a continuation-in-part of U.S. patent application Ser. No. 414,967 filed Sept. 7, 1982 and now abandoned.

The invention relates to connectors for enabling a sealed attachment of air lines or pipe lines to another pipe, and to connectors for use on vehicle exhaust systems. More particularly, the invention relates to connectors for enabling a sealed attachment of air lines for catalytic converters to pipes which are used in vehicle exhaust systems to test catalytic converters.

Present day automobile exhaust systems often contain catalytic converters for converting carbon monoxide gases into gases which might be less harmful to the environment. Many of these exhaust systems often have air pumps which pump air through a line extending into the catalytic converters to dilute the gases and to further reduce the amount of harmful gases emitted from the exhaust systems into the atmosphere.

A testing of such catalytic converters is desirable to determine the continued effectiveness of the converters and the quality and quantity of emitted gases. Therefore, a test pipe is sometimes substituted for a catalytic converter when it is desirable to test or compare the gases emitted from an automobile exhaust system with and without the catalytic converter. These test pipes must operate under the same conditions that catalytic converters operate under, and should be attached into the exhaust system in the same manner as a catalytic converter is attached. Therefore, the test pipes should be connected to the same air lines which are used in conjunction with catalytic converters.

Some vehicles have air lines that slip onto catalytic converters or test pipes. Other vehicles have air lines with threaded ends. Accordingly, the inventive connector should be adapted to fit either type of air line.

Accordingly, an object of the invention is to provide new and improved means for and methods of connecting air lines to pipes, especially in vehicular exhaust systems. A more particular object is to provide a simple and inexpensive connector for an air line to an exhaust system, which connector may be installed quickly and easily.

Yet another object is to provide air line to exhaust system connectors that attach in a tightly sealed arrangement to catalytic converter test pipes so that the air entering the test pipes is of the same quantity as that entering the catalytic converters which are replaced by the test pipes.

Still another object is to provide air line to exhaust system connectors for enabling installation on a great variety of vehicle exhaust systems.

In keeping with one aspect of this invention, a small pilot hole is first drilled into a catalytic converter test pipe. A saddle containing an aperture and two bolt openings fits onto the catalytic converter test pipe. The aperture of the saddle holds a connector element having a head with a connector on one end and a tapered pipe on the other end. The connector end is fitted into the aperture with the head resting on the saddle. The tapered pipe, which projects above the head, is then inserted into the drilled hole, while the connector pipe on the opposite end is connected to an air line. A U-bolt, with two threaded ends fitting into the saddle bolt openings, is placed on the side of the test pipe which is opposite the saddle, so that when nuts are tightened onto the two threaded ends of the U-bolt, the tapered end of the connector pipe is driven into a hole in the test pipe. The metal of the test pipe forms a dimple, stretches, and seals itself around the tapered pipe and against the head of the connector element.

The invention will be best understood by reference to the following description of the invention taken in conjunction with the attached drawings in which:

FIG. 1 is a perspective view of an exhaust system with a catalytic converter;

FIG. 2 is a perspective view of an exhaust system with a catalytic converter test pipe showing the inventive air line to exhaust system connector;

FIG. 3 is an exploded view of the inventive air line to exhaust system connector;

FIG. 4 is a plan view of a connector element of the inventive air line to exhaust system connector;

FIG. 5 is an end view of the inventive air line to exhaust system connector element;

FIG. 6 is a partially cross-sectional view of the tapered end of the inventive connector after it is inserted into a catalytic converter test pipe.

Figure 7:
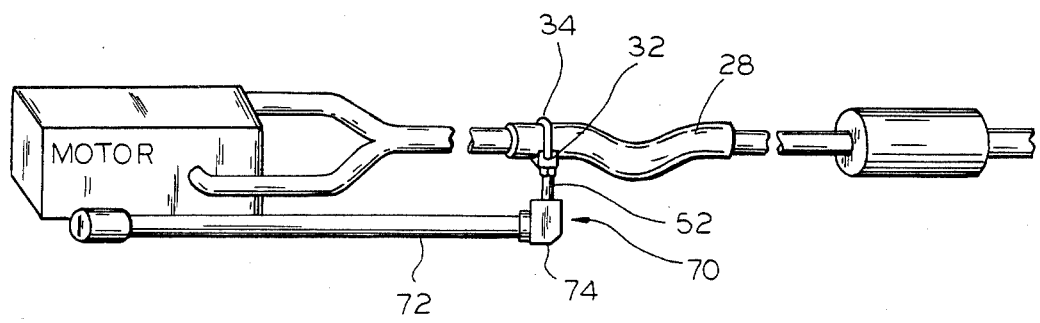
FIG. 7 is a perspective view of an exhaust system with a catalytic converter test pipe showing an alternate embodiment of the inventive air line to exhaust system connector for use with vehicles having a threaded air line.

As shown in FIG. 1, a conventional vehicle exhaust assembly system 10 is connected to a motor 12. As here shown, it is assumed that there may be a V-8 or a V-6 engine with a forked pipe 14 connected to its manifolds. An air pump 16, air ine 18, air line connector means 20, catalytic converter 22, muffler 24 and tail pipe 26 complete the exhaust system. The air line 18 conveys fresh air into the catalytic converter 22 where it is mixed with the auto exhaust to dilute the gas from the engine and to improve the converter performance.

When the catalytic converter is tested to determine its efficiency, a test pipe is substituted therefor, so that the exhaust system has the same configuration both with and without the catalytic converter. In FIG. 2 a test pipe 28 is attached between the forked pipe 14 and the muffler 24, in lieu of the converter 22.

To avoid changing the exhaust system configuration during testing, the inventive air line to exhaust system connector 30 allows a quick and easy attachment of the air pump 16 and air line 18 to the test pipe 28. In greater detail, as shown in FIG. 2, the air line to exhaust system connector 30 attaches around the test pipe at a point where the air line would normally connect to the catalytic converter. Thus, the test pipe 28 will be utilized under the same conditions as the catalytic converter 22, with air pump 16 pumping air through line 18 and into the test pipe 28.

FIG. 3 is an exploded, detailed view of the inventive air line to exhaust system connector 30. The connector 30 comprises a sheet metal saddle 32 folded to have a generally U-shaped cross-sectional configuration, a U-bolt 34, a connector element 36, and two nuts 38, 40. The saddle 32 has two holes 42, 44 in its bottom section through which the threaded ends of the U-bolt 34 fit. The saddle 32 also contains an aperture 46 in which end pipe 52 of the connector element 36 fits.

The U-bolt 34 has two threaded ends 48, 50 which fit through holes 42, 44 of the saddle 32. After U-bolt threaded ends 48, 50 are inserted through the saddle holes 42, 44, the nuts 38, 40 secure the U-bolt 34 to the saddle 32.

The connector element 36 comprises connector end 52, connector head 54 and tapered pipe 56. The head 54 has two flat sides 58, 60. The connector end 52 fits through aperture 46 of the saddle 32 for enabling a connection to the air line 18. Thus, connector element 36 enables a connection of the air line 18 to the test pipe 28, when the air line connector 30 is fully attached to the exhaust system as shown in FIG. 2. The tapered pipe 56 enables an entry of the connector element 36 into the test pipe 28. The head 54, with its two flat sides 58, 60, enables the connector element 36 to be fitted and held securely in place inside the saddle 32, so that the head 54 will not rotate when in operation.

The connector element 36 is placed into the saddle 32 with the connector end 52 inserted into aperture 46 of the saddle 32. Connector head 54 sits within the saddle 32, while connector end 52 protrudes outside of the saddle 32.

To install the inventive air line to exhaust system connector 30 into a test pipe 28, a pilot hole of approximately ¼ inch is drilled into one side of the test pipe 28 at point 62 (FIG. 6). Next, the saddle 32 with its inserted connector element 36 is placed onto the test pipe 28 so that the tip end of tapered pipe 56 is fitted into the ¼ inch hole.

The U-bolt 34 is then placed on the opposite side of the test pipe 28 in relation to the saddle 32, so that the U-bolt threaded ends 48, 50 fit into the two holes 42, 44 of the saddle 32. The nuts 38, 40 are placed on ends 48, 50 to secure and lock the air line to exhaust system connector 30 into position around the test pipe 28. As the nuts 38, 40 are tightened, the tapered pipe 56 is driven into the test pipe 28 causing the pipe to dimple, and the edge of the ¼ inch hole 62 bends inwardly (FIG. 6) to stretch somewhat and form a metal-to-metal seal around the tapered pipe 56. The edge of the stretched hole would tend to bite into the tapered pipe, if it is withdrawn, thus tending to enhance the seal. The air line 18 is easily connected to the connector element 36 at end 52 so that air from air pump 16 enters the test pipe 28 in the same way that it normally enters a catalytic converter.

As can be seen in FIG. 6, the tapered pipe 56 enters the test pipe 28 in a tightly sealed arrangement. This is due to the tapering of the outer edge of the pipe 56 and the dimpling of the edge of the ¼ inch hole 62 in the test pipe 28 as the tapered pipe 56 is forced into the hole when the nuts 38, 40 are tightened. Thus, very little or no air can escape from or be drawn into the test pipe 28 at the ¼ inch hole 62.

The air line to exhaust system connector 30 described thus far enables an air line 18 to be slipped onto the connector end 52. This connector 30 is suitable for particular types of vehicle air lines which are adaptable to a slip-on connection.

Figure 8:
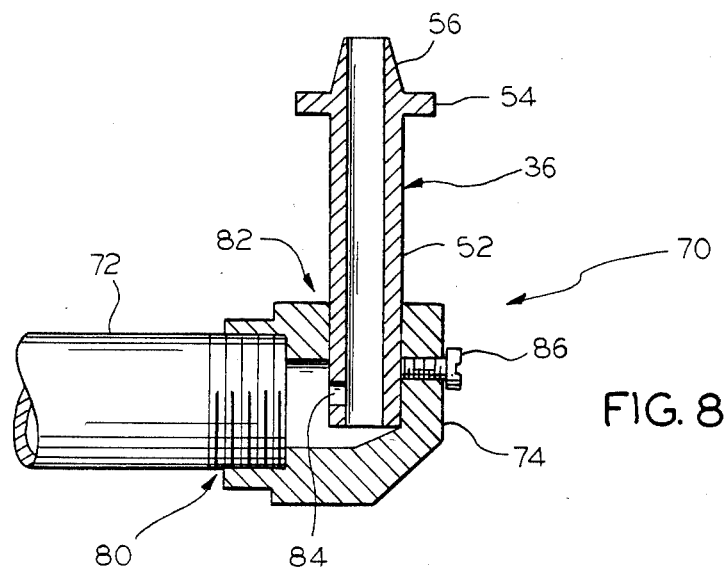
FIG. 8 is a fragmentary, partially cross-sectional view of the connector of FIG. 7.

As shown in FIGS. 7 and 8, an alternative embodiment of the invention for use with vehicles having another type of air line provides a connector 70 which enables an attachment of an air line 72 to pipe 28 (FIG. 2) by means of a threaded coupler 74. The coupler 74 has an input port 80 and an outlet port 82. The air line 72 is a preferably metal threaded end which fits into mating threads in the inlet port 80. The coupler 74 also has an exit port 82 which enables the connector end 52 to be inserted therein. The connector end 52 may be secured to the coupler in any suitable manner as by pressfitting, welding, threading, using a set screw 86, or the like. Also, the coupler 74 can be rotated three hundred and sixty (360) degrees around the connector end 52 to enable an air line to enter and be attached to the connector end 52 from a variety of directions. An aperture 84 is formed in the connector end 52 in any suitable manner, as by drilling or the like.

Thus the connector end 52 of FIGS. 3 and 4 may be adapted for use with either a slip-on or threaded end of an air line.

The many advantages of this air line to exhaust system connector are self-apparent. First, the parts are easily and inexpensively made on general purpose machine tools. Second, the air line to exhaust system connector may be installed quickly and easily in a catalytic converter test pipe. Finally, the dimpled seal formed by insertion of the tapered pipe into the test pipe enables air to be pumped into the test pipe as efficiently as it would be in a catalytic converter. Of course, there are still other advantages which will be apparent to those skilled in the art.

While the invention has been described in connection with exhaust systems, it is to be understood that the connector could have many other uses whenever it is necessary to attach a line to another pipe. An example of this would be attachment of an ice-maker in a refrigerator to a water line, or attachment of a clean-out pipe to a water pipe line. The inventive connector is especially adapted to areas where the environment would be hostile to any gasket arrangements which might otherwise be placed between a saddle clamp and a pipe to prevent leaking.

Those who are skilled in the art will readily perceive how to modify the invention. Therefore, the appended claims are to be construed to cover all equivalent structures which fall within the true scope and spirit of the invention.

What is claimed:

1. An air line to exhaust system connector for a vehicle exhaust system having an exhaust pipe, said connector comprising means including a pipe element with a tapered section, said tapered section having a narrow part and a wide part, said narrow part being a first end of said pipe element, said wide part terminating in a flat head, means for driving said tapered section into a pilot hole located in said exhaust pipe until said flat head comes into abutment with said exhaust pipe, said tapered section spreading said pilot hole when said tapered section is driven into said pilot hole and means for attaching an air line to said vehicle exhaust system provided by a second end of said pipe element, each of said tapered first end, flat head and second end sections being integral thereby forming said pipe element, said means for driving said tapered section into said exhaust pipe including a saddle, a U-bolt with nuts, said saddle containing two bolt openings for attachment of said U-bolt to said saddle and an aperture for fitting said pipe element into said saddle.

2. The air line to exhaust system connector of claim 1, wherein the flat head of said pipe element has two flat sides and said saddle has a generally U-shaped cross section with the flat sides on said head embraced within said cross section to prevent movement of said pipe element within said assembly.

3. The air line to exhaust system connector of claim 1 wherein said exhaust system connector is attached to a catlytic converter test pipe.

4. The air line to exhaust system connector of claim 1 wherein said air line is a pipe, said air line having a threaded end and wherein said attaching means further comprises a coupler having an outlet for receiving said second end section of said pipe element and an inlet which is threaded to receive the threaded end of said airline.

5. The air line to exhaust system connector of claim 2 wherein said air line is a pipe, said air line having a threaded end and wherein said attaching means further comprises a coupler having an outlet for receiving said second end section of said pipe element and an inlet which is threaded to receive the threaded end of said airline.

6. The air line to exhaust system connector of claim 3 wherein said air line is a pipe, said air line having a threaded end and wherein said attaching means further comprises a coupler having an outlet for receiving said second end section of said pipe element and an inlet which is threaded to receive the threaded end of said airline.

7. A saddle connector comprising a saddle with a U-shaped cross section and two opposing bolt openings with an intermediate aperture between said bolt openings, a U-bolt comprising two threaded ends which fit into said opposing bolt openings in said saddle, a pipe element which fits into said aperture of said saddle, said pipe element integrally comprising a tapered section, a head, and a connector end, said head having two flat sides which fit into said U-shaped cross section to prevent rotation of said pipe element when it is placed in said aperture of said saddle, and two nuts which fit onto said U-bolt threaded ends for securing said U-bolt to said saddle and for driving said tapered section into a drilled hole in a pipe.

* * * * *